United States Patent
O'Shea

(10) Patent No.: US 7,681,864 B2
(45) Date of Patent: Mar. 23, 2010

(54) ADJUSTABLE ACTUATOR STOP

(75) Inventor: Timothy M. O'Shea, Chicago, IL (US)

(73) Assignee: Val-Matic Valve & Manufacturing Corp., Elmhurst, IL (US)

( * ) Notice: Subject to any disclaimer, the term of this patent is extended or adjusted under 35 U.S.C. 154(b) by 671 days.

(21) Appl. No.: 11/519,305

(22) Filed: Sep. 12, 2006

(65) Prior Publication Data

US 2008/0061260 A1  Mar. 13, 2008

(51) Int. Cl.
  *F16K 31/50* (2006.01)
(52) U.S. Cl. .................. 251/288; 251/266; 251/274; 251/285; 74/89.37
(58) Field of Classification Search .............. 251/58, 251/59, 60, 101, 102, 129.12, 225, 285, 288, 251/266, 274; 74/10.35, 10.2, 89.37
  See application file for complete search history.

(56) References Cited

U.S. PATENT DOCUMENTS

| 1,406,748 | A |   | 2/1922  | Massip |
|---|---|---|---|---|
| 3,147,766 | A |   | 9/1964  | Herring et al. |
| 3,262,535 | A |   | 7/1966  | De Pasqua |
| 3,385,120 | A |   | 5/1968  | Nott |
| 3,459,058 | A | * | 8/1969  | Fawkes .................... 74/89.45 |
| 3,575,378 | A |   | 4/1971  | Fawkes |
| RE29,253  | E |   | 6/1977  | Daghe et al. |
| 4,075,898 | A | * | 2/1978  | Carlson, Jr. .................... 74/50 |
| 4,146,050 | A |   | 3/1979  | Graves |
| 4,428,242 | A |   | 1/1984  | Holstrom |
| 4,704,912 | A |   | 11/1987 | Payne |
| 5,255,882 | A | * | 10/1993 | Schroppel .................. 244/3.24 |
| 2007/0045585 | A1 | * | 3/2007 | Kress ......................... 251/285 |

* cited by examiner

*Primary Examiner*—John Rivell
*Assistant Examiner*—Jeremy S Baskin
(74) *Attorney, Agent, or Firm*—Greer Burns & Crain Ltd

(57) ABSTRACT

A valve actuator including a body, a rotatable drive screw having an external thread over at least a portion of its length and extending through the body and projecting out at least one side of the body. An internally threaded member is captured on the drive screw on the interior of the body, the member being held against rotation during rotation of the drive screw, so as to cause the member to travel along a length of the drive screw as the drive screw is rotated in both a first and second rotational direction. At least one sleeve having an abutment surface engagable by the member upon a sufficient rotation of the drive screw in one of the two directions. The sleeve surrounds the drive screw and may be axially adjustable relative to the drive screw from the exterior of the body. The sleeve may be threadingly engaged with the drive screw and slidingly carried in the body such that a load created by the threaded member pressing against the abutment surface of the sleeve is transferred from the sleeve to the drive screw as a tensile load.

22 Claims, 6 Drawing Sheets

ADJUSTABLE ACTUATOR STOP

BACKGROUND OF THE INVENTION

The present invention generally relates to actuators for valves, for example external actuators for valves such as butterfly valves.

Actuators for valves, such as butterfly valves, are well known. In some arrangements, a drive screw is rotated to cause a traveling nut to move a crank arm attached to the valve axle to rotate the valve member into and out of engagement with the valve seat.

In the case of a butterfly valve, the valve member is rotated approximately 90 degrees between an open position and a closed position. The precise closed position may change over time as the valve seat wears, or as conditions require greater or lesser closing force of the valve member against the valve seat. Typically some type of abutment occurs between the traveling nut and a fixed nut carried on the drive screw, as shown in U.S. Pat. Nos. Re. 29,253 and 3,147,766, or between the crank arm and an adjustable stop, such as a screw projecting through a wall of the actuator body, as shown in U.S. Pat. No. 3,385,120.

Screws projecting through the actuator body are not useful for large valves in that the torques required to close the valve either cause failure of the body wall at the location of the screw penetration, or require an overly thick wall at the penetration point, increasing the cost of the actuator.

The use of adjustable stop nuts located in the interior of the actuator body requires the body to be opened to make adjustments to the stop positions. Usually the interior of the actuator body is filled with grease making the adjustment a messy operation, but also, the operation is time consuming in that the actuator body must be opened, the nut located and cleaned to provide access, a locking pin must be located and driven out of the openings where it is located, generally in tight quarters, the nut rotated to a new position, the pin re-driven into the openings, again in tight quarters, grease repacked into the interior, and then the body being sealed closed. This is often a trial and error process requiring the body to be opened more than once.

U.S. Pat. No. 3,575,378 discloses a sleeve 36, secured axially in place on the drive shaft 13 by stop collars 43 and 44. The sleeve 36, and drive shaft 13 are held in an exteriorly adjustable position by a setscrew 41. The setscrew 41 may be loosened to allow an axial repositioning of both the sleeve 36 and the drive shaft 13, but does not allow for adjustment of the sleeve relative to the drive shaft from the exterior of the body. The setscrew 41 must hold against the closing force of the nut 16 driven by the drive shaft 13, however, a side pressing setscrew is not capable of providing support against 450 ft-lbs of load often created in closing large butterfly valves. Further, the setscrew 41 transfers the load created by the press of the nut 16 against the collar 43 directly to the fixed support portion 35 of the housing 20, requiring a substantially thickened housing wall.

U.S. Pat. No. Re. 29,253 provides a collar 60 which defines an end stop 66 for the operating nut 100 carried on the operating shaft 28. The collar 60 is exteriorly adjustable, relative to the housing 26 via a threaded connection 58 with the housing, however, the collar is positionally fixed relative to the operating shaft 28 via a retainer nut 80 holding a stem bushing member 76 against the collar, with the stem bushing member being pinned to the operating shaft 28 at 78. Thus, when the position of the collar 60 relative to the housing 26 is changed, the axial position of the operating shaft 28 is also changed, and the axial position of the collar cannot be adjusted relative to the operating shaft from the exterior. Further, the load created by the operating nut 100 pressing against the collar 60 or the stop 50 is transferred directly to the housing 26 via the threaded connection 58 of the collar with the housing.

U.S. Pat. Nos. 4,146,050, 3,262,535 and 1,406,748 show various types of externally adjustable sleeves for different types of valves.

SUMMARY OF THE INVENTION

The present invention provides a valve actuator, such as the type used to open and close butterfly valves. The valve actuator includes a body, having an interior and an exterior, with a rotatable drive screw extending through the interior of the body and projecting out at least one side of the body. The drive screw has an external thread over at least a portion of its length.

An internally threaded member, sometimes referred to as a crosshead, and which acts as a traveling nut, is captured on the drive screw in the interior of the body. The member is held against rotation during rotation of the drive screw, so as to cause the member to travel along a length of the drive screw as the drive screw is rotated in both a first and second rotational direction.

A sleeve surrounds the drive screw and projects into the interior and into the exterior of the body. The sleeve may be axially adjustable relative to the drive screw from the exterior. The sleeve has an abutment surface engagable by the member upon a sufficient rotation of the drive screw in one of the two directions. The sleeve may be threadingly engaged with the drive screw and slidingly carried in the body such that a load created by the member pressing against the abutment surface of the sleeve is transferred from the sleeve to the drive screw as a tensile load.

In an embodiment, the sleeve is positioned in a bearing for the drive screw.

In an embodiment, a drive mechanism is located on an exterior of the body and is engaged with the drive screw to effect rotational movement of the drive screw relative to the body.

In an embodiment, the drive screw projects through two sides of the body and two bearings are provided for the drive screw.

In an embodiment, an adjustable stop nut is carried on the drive screw on a side of the member which is opposite the sleeve.

In an embodiment, a locking arrangement is associated with the sleeve to lock the sleeve in a selected axial position relative to the drive screw.

In an embodiment, the locking arrangement comprises a removable and replaceable pin engageable with the sleeve.

Other details of embodiments of the present invention are illustrated in the drawings and described below.

DETAILED DESCRIPTION OF THE PREFERRED EMBODIMENTS

Figure 1:
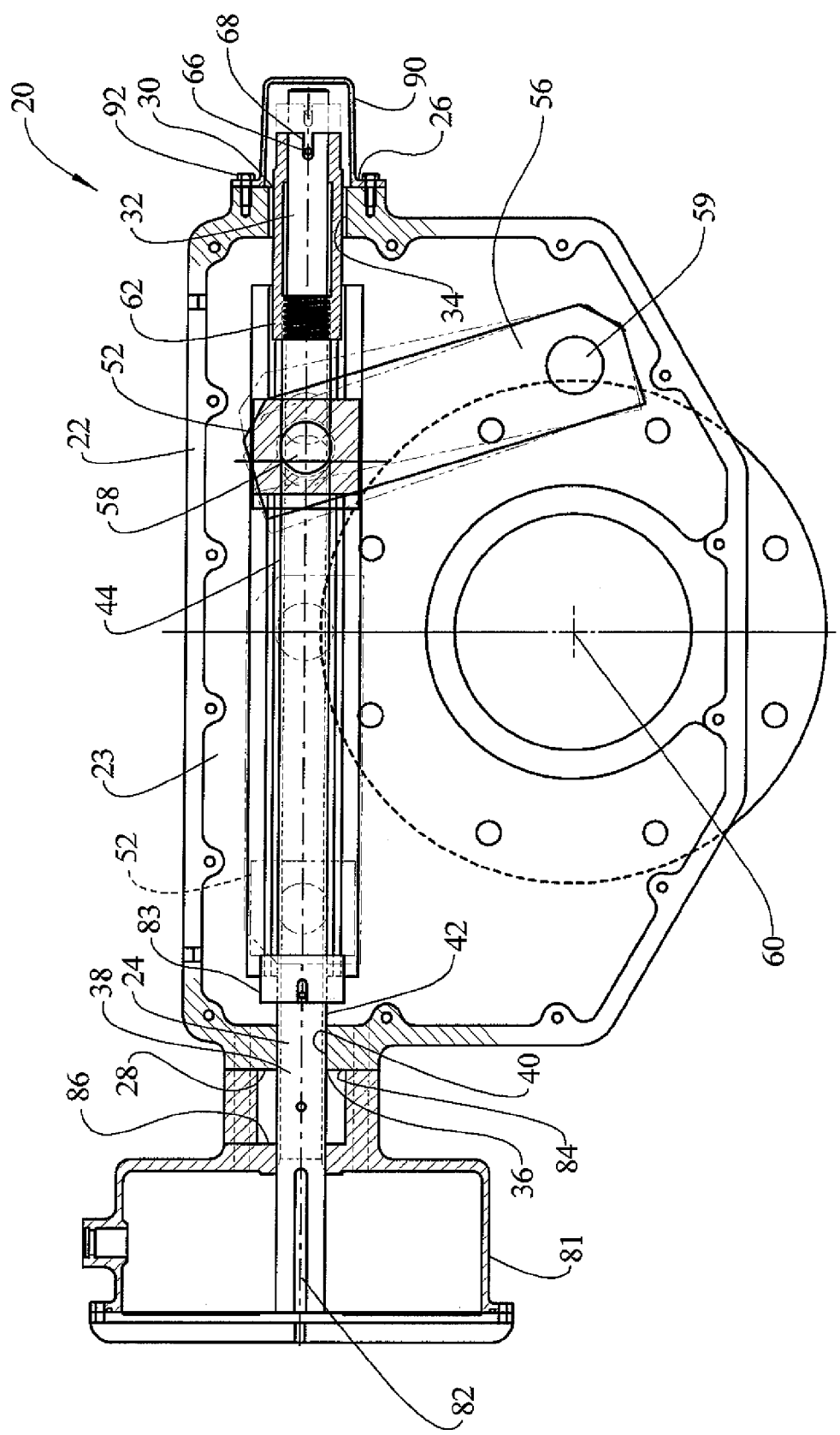
FIG. 1 is a cross-sectional view of a valve actuator embodying the principles of the present invention.

The present invention, as shown in FIG. 1, generally relates to a valve actuator 20, such as the type used to open and close butterfly valves. The valve actuator 20 includes a body 22 which has a generally hollow interior 23, with various openings therein, as discussed below. A rotatable actuator stem 24 in the form of a drive screw extends through the body 22 and projects out at least one side of the body, and as shown in the embodiment of FIG. 1, it extends out a first 26 and a second 28 side. A first opening 30 is provided for a first portion 32 of the drive screw 24 and forms a first bearing 34, and a second opening 36 is provided for a second portion 38 of the drive screw and forms a second bearing 40. The drive screw 24 has an external thread 42 over at least a portion of its length, and in the embodiment shown in FIGS. 1 and 2, the external thread is provided along a central portion 44 of the drive screw, but is not present at the first portion 32 where the drive screw extends to the exterior of the body 22.

Figure 2:
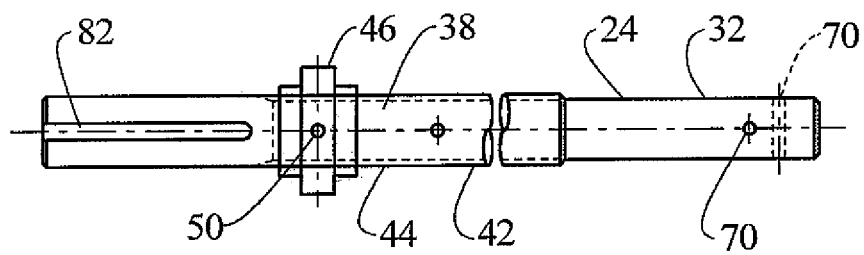
FIG. 2 is a side elevational view of the drive screw of the actuator in isolation.

The drive screw 24 is shown in isolation in FIG. 2 where it can more easily be seen that a collar 46 is formed or separately attached to the drive screw. In a preferred embodiment, the collar 46 is formed separately and is internally threaded such that it can be threaded onto the drive screw 24 and then secured in place, such as with a pin 50 inserted into aligned openings in the collar and drive screw. The openings can be formed, such as by drilling, after the collar 46 is placed into a desired position on the drive screw 24. The purpose of the collar is discussed below.

Figure 3:
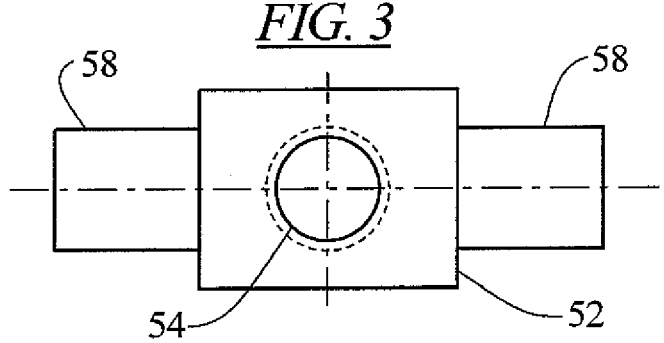
FIG. 3 is a side elevational view of the traveling nut member of the actuator in isolation.
Figure 4:
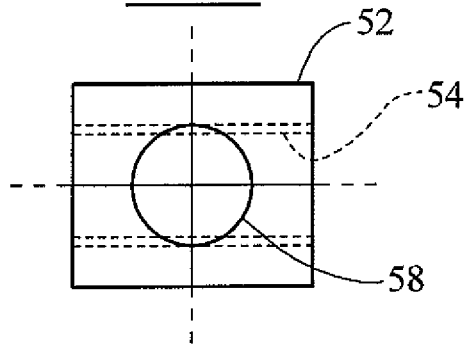
FIG. 4 is an end elevational view of the traveling nut member of the actuator in isolation.

An internally threaded member 52, sometimes referred to as a crosshead, and which acts as a traveling nut, is captured on the drive screw 24 in the interior of the body 22. The member 52 is shown in isolation in FIGS. 3 and 4, where it can be seen that an internally threaded bore 54 is provided in the member which can threadingly engage with the external thread of the drive screw 24. The member 52 is held against rotation during rotation of the drive screw 24, so as to cause the member to travel along a length of the drive screw as the drive screw is rotated in both a first and second rotational direction. One way that the member may be held against rotation is shown in FIG. 1 in which actuator links 56 engage with posts 58 extending from opposite sides of the member (FIG. 3). These links 56 attach via a pivot pin 59 to an arm, not shown, that is rotatable about an axis 60 to cause the valve flap to rotate, such as by being an extension of an axle of a butterfly valve. The links 56 attach to both posts 58, and act in opposite directions to resist the rotation force applied to the member 52 by the drive screw 24 as it rotates. As the drive screw 24 rotates, the member 52 will be caused to travel along the length of the drive screw, pulling the links 56 along with it, and thus moving the pivot pin 59 through an angle of approximately 90 degrees. In this manner, the valve axle can be rotated directly through the same angle of 90 degrees.

Figure 5:
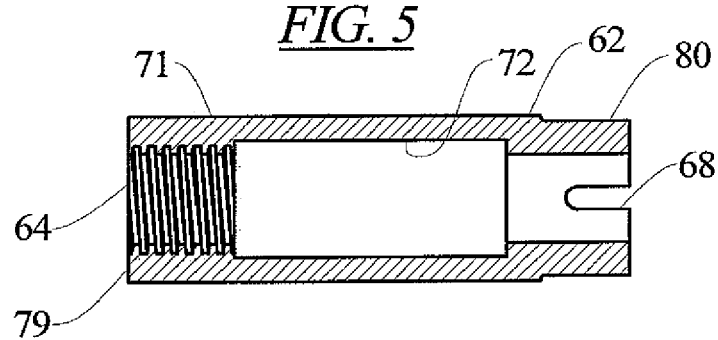
FIG. 5 is a side sectional view of the sleeve of the actuator in isolation.

A sleeve 62 surrounds the drive screw 24 and is axially adjustable relative to the drive screw. In the embodiment illustrated in FIG. 1, and in isolation in FIG. 5, the sleeve 62 has a portion 64 that is internally threaded, so that it can threadingly mate with the drive screw 24 to provide the axial adjustment between the sleeve and the drive screw. As shown in the embodiment illustrated in FIG. 1, the sleeve 62 may be positioned in the bearing 34 for the first portion 32 of the drive screw 24. In this arrangement, a locking arrangement may be provided between the sleeve 62 and the drive screw 24 so that the sleeve is secured to the drive screw once the sleeve has been moved into a desired axial position, such as by inserting a pin 66 into aligned openings 68, 70 in the sleeve and the drive screw. The sleeve 62 will then rotate with the drive screw 24 as the drive screw is rotated, with the sleeve providing a sliding outer surface 71 for engagement with the bearing 34. The pin 66 may be a spring pin, or other known type of pin. This method of securing the stop provided by the sleeve 62 is simple and reliable, but allows only six adjustment positions for every revolution of the sleeve on the threaded stem 24. Preferably the stem 24 is not threaded in the vicinity of the pin 66. This is because the sleeve 62, which has a threaded portion 64 at only one end and has an enlarged bore 72 in the center section, would otherwise need to be threaded straight through. Threading the sleeve 62 straight through, however, is a difficult proposition for manufacturing. Multiple pin holes 70 (staggered 90 degrees) through the stem 24 provide a longer range of adjustment, which in the case of a single hole 70 would be limited to the depth of the milled slot 68 in the sleeve 62.

Figure 6:
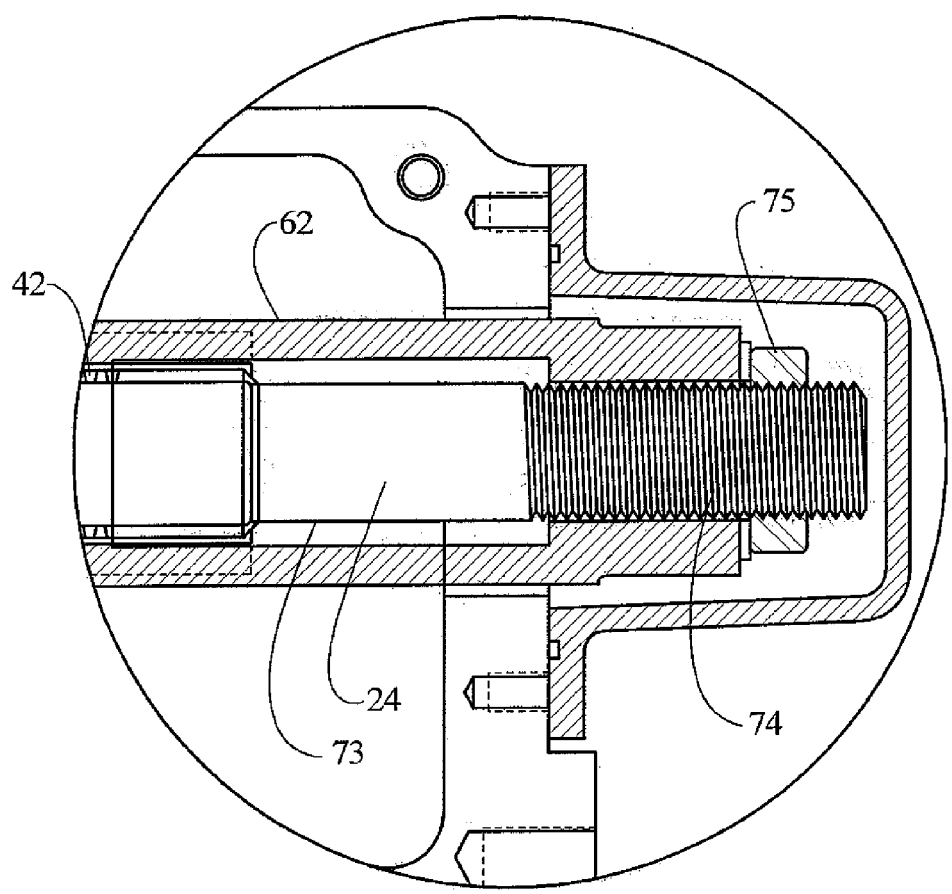
FIG. 6 is a side sectional view of a second embodiment of the stop nut locking arrangement.
Figure 7:
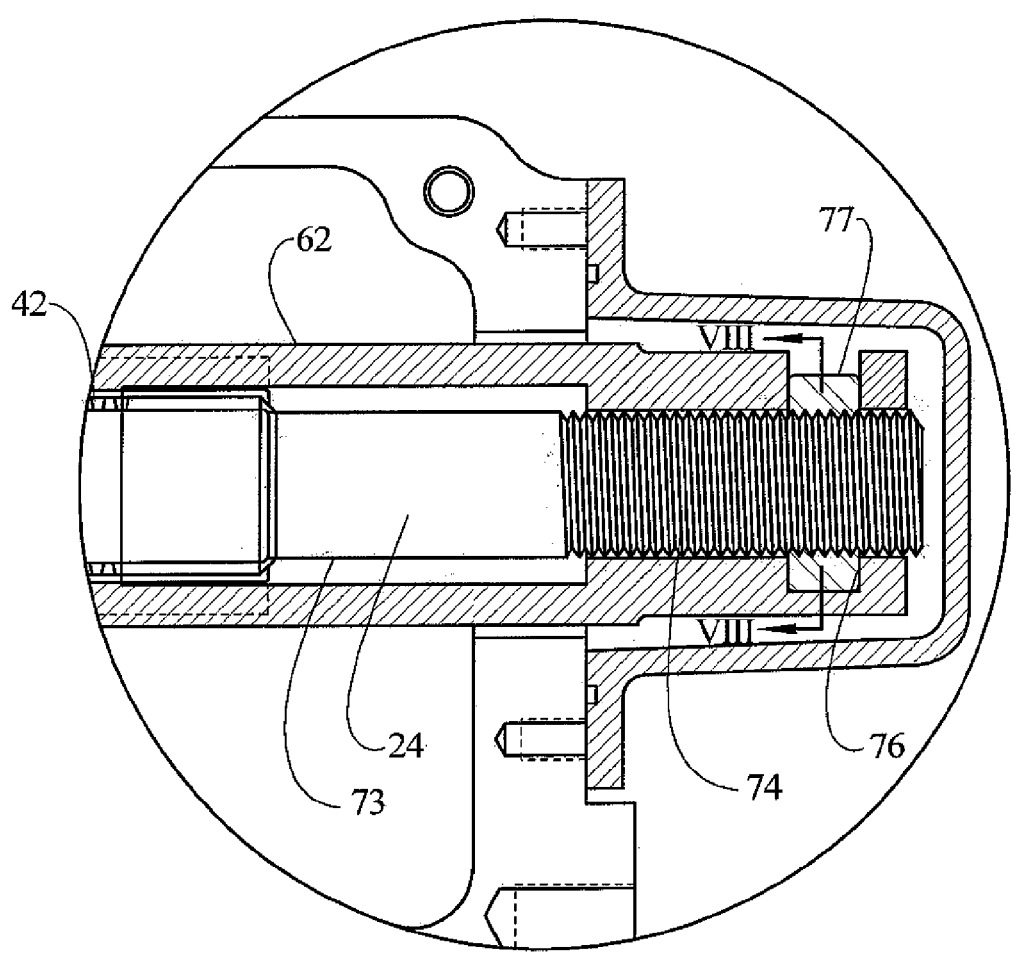
FIG. 7 is a side sectional view of a third embodiment of the stop nut locking arrangement.

In other embodiments, the sleeve 62 may be axially adjustable relative to the drive screw 24, other than by a threaded engagement with the drive screw, such as by being pinned to the drive screw at one of a plurality of discrete axial locations along the drive screw, with the sleeve axially slidable relative to the drive screw before being pinned thereto. Other arrangements are illustrated in FIG. 6 and FIG. 7. In the embodiment shown in FIG. 6, an end of the stem 24 transitions from threads 42 (which may be ACME threads) to a straight section 73 (the diameter being just a little smaller than the minor diameter of the ACME thread, just as in the embodiment shown in FIG. 1). The stem 24 then transitions to a fine screw thread 74 with a major diameter less than or equal to the diameter of the straight section 73. The sleeve 62 is locked in place by means of a nut 75 (or lock washer) engaging the fine threads 74 and pressing against the sleeve. This embodiment of the sleeve features continuous adjustment of the stop position provided by the sleeve, but lacks the security of the pinned connection provided in the embodiment of FIG. 1.

Figure 8:
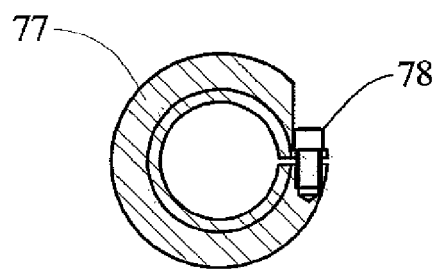
FIG. 8 is a sectional view taken generally along the line VIII-VIII in FIG. 7

In the embodiment shown in FIGS. 7 and 8, much of the arrangement is the same as in the embodiment of FIG. 6, except that the sleeve 62 is slightly extended with a 180 degree pocket 76 cut into one side, in order to retain a locking nut collar 77. During adjustment, the locking nut collar 77 is loosened, and held from rotation relative to the sleeve 62. The sleeve 62 is moved to the desired position, and then a socket head cap screw 78 on the locking nut collar 77 is tightened to secure the collar to the stem 2, providing a stop just as secure as that provided in the embodiment shown in FIG. 1, with the continuous adjustment capability of the embodiment shown in FIG. 6. The only drawback to the embodiment shown in FIGS. 7 and 8 the extra cost of the locking nut collar 77.

In still other embodiments, the sleeve 62 may be fixed to the body 22, at positions that are adjustable relative to the drive screw 24, such as by a threaded engagement between an outer thread on the sleeve and an internal thread on the body. In such an arrangement, the sleeve 62 would provide the bearing surface on its interior, engagable with a mating bearing surface on the drive screw 24, and the sleeve would not rotate with the drive screw.

In any of the embodiments, the sleeve 62 has an abutment surface 79 engagable by the member 52 upon a sufficient rotation of the drive screw 24 in one of the two directions, such as clockwise or counter-clockwise, depending on the hand of the screw thread on the drive screw. Since the sleeve 62 initially is axially adjustable relative to the drive screw 24, the extent of travel of the member 52 towards the sleeve before engaging the abutment surface 79 can be adjusted, permitting the pivot pin 59 to move through a range slightly more or less than 90 degrees (from the position shown in solid lines to the position shown in phantom), to permit the valve actuator 20 to be adjustable, so as to be able to provide an adjustable closing position for the valve flap. As the valve is operated over time, its seats wear and adjustment of the closing position may be made, without changing the seat in the valve.

In embodiments where the sleeve 62 is threadingly engaged with the drive screw 24 and is slidingly carried in the body 22, a load created by the member 52 pressing against the abutment surface 79 of the sleeve is transferred from the sleeve to the drive screw as a tensile load. In situations where significant force is required to close the valve, forces of at least 450 foot-pounds may be generated by the pressing of the member 52 against the abutment surface 79, a force which is easily accommodated by the tensile strength of the drive screw 24. This closing force is not transferred to the body 22, thereby avoiding the need to substantially modify the housing wall in an attempt to provide sufficient support against this closing force.

Figure 10:
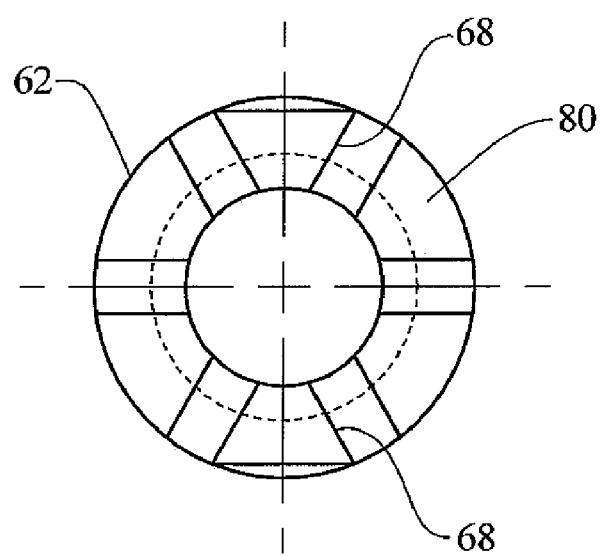
FIG. 10 is an end elevational view of the sleeve that surrounds the drive screw.

In an embodiment, the sleeve 62 may be accessible from the exterior of the body 22 so that the adjustability of the actuator operation can be achieved without disassembling or opening the body. As shown in FIG. 10, the sleeve 62 may have a castellated end 80, with a number of openings 68, that may preferably be formed as slots, for receiving the retaining pin 66. For example, six slots 68 may be provided in the end 80 of the sleeve 62, such that upon each 60 degrees of rotation of the sleeve on the drive screw 24, a new slot will align with the opening 70 in the drive screw. The forming of the openings 68 in the sleeve 62 as slots will permit axial movement of the sleeve on the drive screw, while still permitting alignment of the openings in the sleeve and the drive screw 24, without requiring a large number of different openings in the drive screw for the pin 66. There may be a second or further additional opening 70 in the drive screw 24 for the pin 66, axially spaced from the first opening 70, to provide for a greater range of adjustability without requiring an excessive length of the sleeve 62 and the slots 68.

A drive mechanism 81 may be located on the exterior of the body 22 and may be engaged with the drive screw 24 to effect rotational movement of the drive screw relative to the body. For example, there may be a keyed connection 82 between the drive mechanism 81 and the drive screw 24. The drive mechanism 81 may be a direct motor drive, a motor drive connected with appropriate gears or belts, or may be a manual drive arrangement.

In the embodiment illustrated in FIG. 1, an adjustable stop nut 83 is carried on the drive screw 24 on a side of the member 52 which is opposite the sleeve 62. This adjustable stop nut 83 is located on the interior of the body 22, and access to the interior is required to make an adjustment to the position of this nut. This nut 83 may be used to set the "open" position of the valve, which normally does not require adjustment, as does the "closed" position of the valve.

Figure 9:
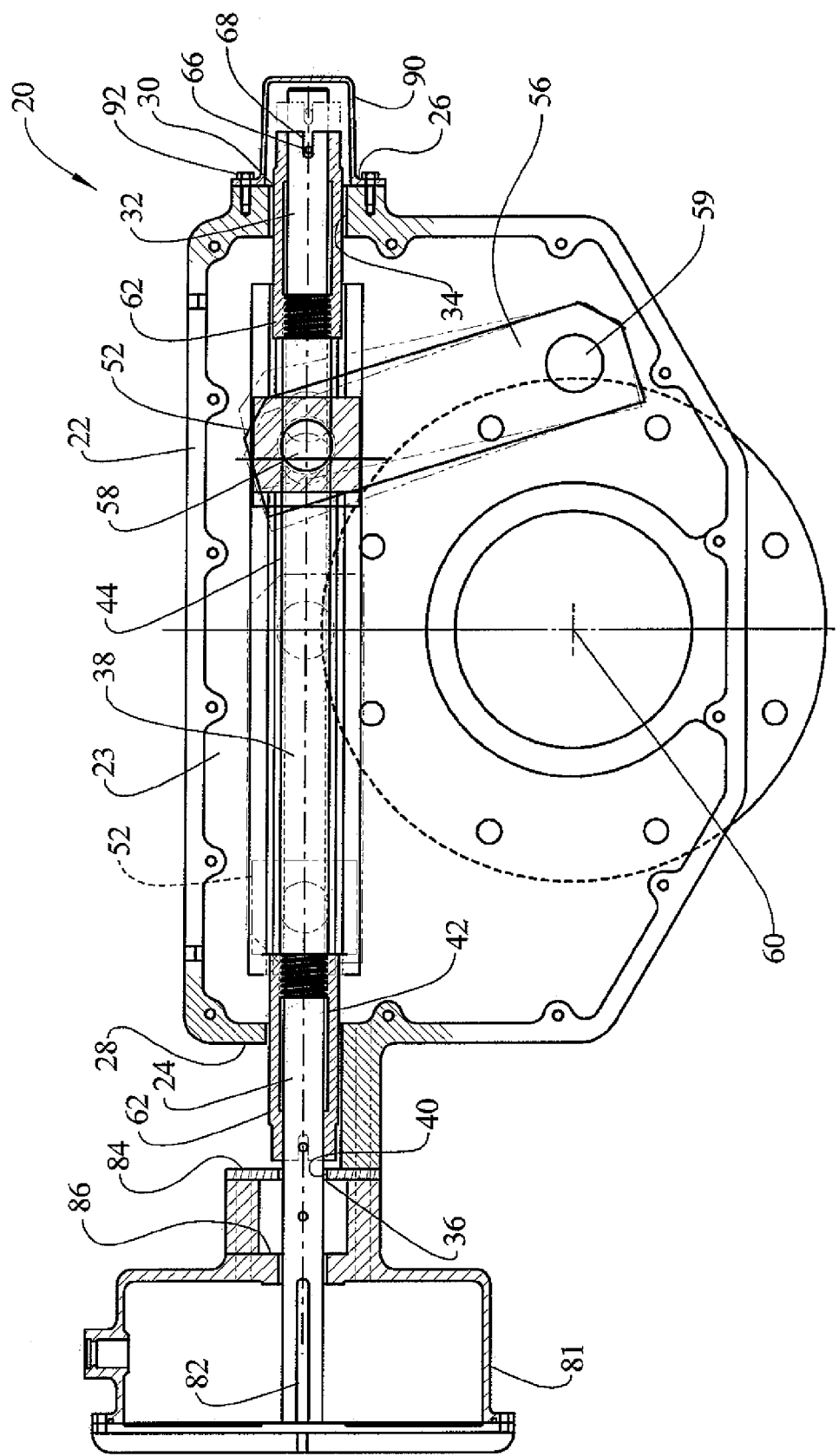
FIG. 9 is a cross-sectional view of a second embodiment of a valve actuator embodying the principles of the present invention.

In other embodiments (see FIG. 9), two sleeves 62 may be provided, one at each side 26, 28 of the body 22 where the drive screw 24 projects from the body, so that the abutment position of the member 52 may be adjusted from the exterior of the body for both the open and the closed positions of the valve.

In order to prevent the drive screw 24 from moving axially as it is being rotated, the collar 46 may be captured between axially fixed walls 84, 86, such as the bearing wall 84 and a wall 86 of the drive mechanism 80. With the collar 46 axially fixed to the drive screw 24 and being prevented from moving axially due to its capture between the fixed walls 84, 86, the drive screw will be prevented from moving axially.

The actuator 20 may also be provided with a removable cover 90 which can be attached to the body 22 to surround and enclose the projecting end of the drive screw 24 and sleeve 62. This cover 90 will prevent dirt and other debris from entering the interior of the actuator body 22, and will also provide a safety shield with respect to the projecting rotating drive screw and sleeve portions. Any number of fastening arrangements can be provided for the cover 90 including threaded fasteners 92 engaged with the body 22, a friction or snap on fit, or other well known attachment mechanisms.

To make adjustments to the end position of the member 52, in the embodiment shown in FIG. 1, it is the simple process of removing the cover 90, removing the pin 66, which is readily accessible, rotating the sleeve 62 relative to the drive screw 38 so as to move the sleeve to the desired axial position relative to the drive screw, realigning the openings 68, 70, reinserting the pin, and replacing the cover. No access to the interior 23 of the body 22 is required, and all steps are carried out in a clean (relatively grease-free) location which is readily accessible.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A valve actuator comprising:
    a body with an interior and an exterior,
    a rotatable, externally threaded drive screw extending through the body and projecting out at least one side of the body,
    a first sleeve surrounding a first portion of the drive screw, extending into the interior of the body and into the exterior of the body,
    a first bearing located at the one side of the body and receiving the first sleeve therein,
    a second bearing in the body and receiving a second portion of the drive screw therein,
    a nut threadingly captured on the drive screw in the interior of the body, the nut being held against rotation during rotation of the drive screw, so as to cause the nut to travel along a length of the drive screw as the drive screw is rotated in both a first and second rotational direction,
    the first sleeve having an abutment surface engagable by the nut upon a sufficient rotation of the drive screw in one of the two directions,
    the first sleeve being threadingly engaged with the drive screw and being slidingly carried in the body such that a load created by the nut pressing against the abutment surface of the sleeve is transferred from the sleeve to the drive screw as a tensile load, and a locking arrangement to lock the first sleeve in a selected axial position relative to the drive screw, the locking arrangement comprising a plurality of diametrical holes, axially spaced apart, in the first portion of the drive screw, at least one slot formed in the first sleeve and a pin received in one of the diametrical holes and in the slot.

2. A valve actuator comprising:

a body with an interior and an exterior, a rotatable, externally threaded drive screw extending through the body and projecting out at least one side of the body, a first sleeve surrounding a first portion of the drive screw, extending into the interior of the body and into the exterior of the body, a first bearing located at the one side of the body and receiving the first sleeve therein, a second bearing in the body and receiving a second portion of the drive screw therein, a nut threadingly captured on the drive screw in the interior of the body, the nut being held against rotation during rotation of the drive screw, so as to cause the nut to travel along a length of the drive screw as the drive screw is rotated in both a first and second rotational direction, the first sleeve having an abutment surface engagable by the nut upon a sufficient rotation of the drive screw in one of the two directions, the first sleeve being threadingly engaged with the drive screw and being slidingly carried in the body such that a load created by the nut pressing against the abutment surface of the sleeve is transferred from the sleeve to the drive screw as a tensile load, and a second sleeve surrounding the second portion of the drive screw and being axially adjustable relative to the drive screw from the exterior of the body, the second sleeve having an abutment surface engagable by the nut upon a sufficient rotation of the drive screw in a second of the two directions, and a locking arrangement to lock the first sleeve in a selected axial position relative to the drive screw, the locking arrangement comprising a plurality of diametrical holes, axially spaced apart, in the first portion of the drive screw, at least one slot formed in the first sleeve and a pin received in one of the diametrical holes and in the slot.

3. The valve actuator according to claim 1, wherein a drive mechanism is located on an exterior of the housing and is engaged with the drive screw to effect rotational movement of the drive screw relative to the housing.

4. The valve actuator according to claim 1, wherein the first sleeve is axially adjustable relative to the drive screw from the exterior of the body.

5. The valve actuator according to claim 1, wherein an adjustable stop nut is carried on the drive screw on a side of the nut which is opposite the first bearing.

6. A valve actuator comprising:

a body having an interior and an exterior, a rotatable drive screw having an external thread over at least a portion of its length and extending through the body and projecting out at least one side of the body, an internally threaded member captured on the drive screw on the interior of the body, the internally threaded member being held against rotation during rotation of the drive screw, so as to cause the internally threaded member to travel along a length of the drive screw as the drive screw is rotated in both a first and second rotational direction, a sleeve surrounding the drive screw, extending into the interior of the body and into the exterior of the body, and being axially adjustable relative to the drive screw, from the exterior of the body, the sleeve having an abutment surface engagable by the internally threaded member upon a sufficient rotation of the drive screw in one of the two directions, and a locking arrangement to lock the first sleeve in a selected axial position relative to the drive screw, the locking arrangement comprising a plurality of diametrical holes, axially spaced apart, in the first portion of the drive screw, at least one slot formed in the first sleeve and a pin received in one of the diametrical holes and in the slot.

7. The valve actuator according to claim 6, wherein the first sleeve is threadingly engaged with the drive screw and is slidingly carried in the body such that a load created by the internally threaded member pressing against the abutment surface of the sleeve is transferred from the sleeve to the drive screw as a tensile load.

8. The valve actuator according to claim 6, wherein a drive mechanism is located on an exterior of the body and is engaged with the drive screw to effect rotational movement of the drive screw relative to the body.

9. The valve actuator according to claim 6, wherein the drive screw projects through two sides of the body.

10. The valve actuator according to claim 6 wherein an adjustable stop nut is carried on the drive screw on a side of the member which is opposite the sleeve.

11. A valve actuator comprising:

a body having an interior and an exterior, a rotatable drive screw externally threaded over a portion of its length, extending though the body and projecting out at least one side of the body, a first sleeve extending into the interior of the body and into the exterior of the body and receiving a first portion of the drive screw therein, a first bearing in the one side of the body receiving the first sleeve, a second bearing in the body receiving a second portion of the drive screw therein, a drive mechanism located on an exterior of the body and engaged with the drive screw to effect rotational movement of the drive screw relative to the body, a nut threadingly captured on the drive screw in the interior of the body, the nut being held against rotation during rotation of the drive screw, so as to cause the nut to travel along a length of the drive screw as the drive screw is rotated in both a first and second rotational direction, the first sleeve being axially adjustable relative to the drive screw from the exterior of the body and having an abutment surface engagable by the nut upon a sufficient rotation of the drive screw in one of the two directions, and a locking arrangement associated with the first sleeve to lock the first sleeve in a selected axial position relative to the drive screw, the locking arrangement comprising a plurality of diametrical holes, axially spaced apart, in the first portion of the drive screw, at least one slot formed in the first sleeve and a pin received in one of the diametrical holes and in the slot.

12. A valve actuator comprising:

a body having an interior and an exterior, a rotatable drive screw externally threaded over a portion of its length, extending through the body and projecting out at least one side of the body, a first sleeve extending into the interior of the body and into the exterior of the body and receiving a first portion of the drive screw therein, a first bearing in the one side of the body receiving the first sleeve, a second bearing in the body receiving a second portion of the drive screw therein, a drive mechanism located on an exterior of the body and engaged with the drive screw to effect rotational movement of the drive screw relative to the body, a nut threadingly captured on the drive screw in the interior of the body, the nut being held against rotation during rotation of the drive screw, so as to cause the nut to travel along a length of the drive screw as the drive screw is rotated in both a first and second rotational direction, the first sleeve being axially adjustable relative to the drive screw from the exterior of the body and having an abutment surface engagable by the nut upon a sufficient rotation of the drive screw in one of the two directions, and a second sleeve receiving the second portion of the drive screw and being received in the second bearing, the second sleeve being axially adjustable relative to the drive screw from the exterior of the body, the second sleeve having an abutment surface engagable by the nut upon a sufficient rotation of the drive screw in a second of the two directions, and a locking arrangement to lock the first sleeve in a selected axial position relative to the drive screw, the locking arrangement comprising a plurality of diametrical holes, axially spaced apart, in the first portion of the drive screw, at least one slot formed in the first sleeve and a pin received in one of the diametrical holes and in the slot.

13. The valve actuator according to claim 11, wherein the first sleeve is internally threaded and threadingly engages with the external thread of the drive screw.

14. The valve actuator according to claim 11, wherein an adjustable stop nut is carried on the drive screw on a side of the nut which is opposite the first sleeve.

15. The valve actuator according to claim 1, wherein the at least one slot formed in the first sleeve is formed at an end of the first sleeve such that the slot is open to the end of the sleeve.

16. The valve actuator according to claim 1, wherein the at least one slot formed in the first sleeve comprises six slots diametrically extending through the sleeve, the six slots angularly spaced from adjacent slots by 60 degrees.

17. The valve actuator according to claim 6, wherein the at least one slot formed in the first sleeve is formed at an end of the first sleeve such that the slot is open to the end of the sleeve.

18. The valve actuator according to claim 6, wherein the at least one slot formed in the first sleeve comprises six slots diametrically extending through the sleeve, the six slots angularly spaced from adjacent slots by 60 degrees.

19. The valve actuator according to claim 11, wherein the at least one slot formed in the first sleeve is formed at an end of the first sleeve such that the slot is open to the end of the sleeve.

20. The valve actuator according to claim 11, wherein the at least one slot formed in the first sleeve comprises six slots diametrically extending through the sleeve, the six slots angularly spaced from adjacent slots by 60 degrees.

21. A valve actuator comprising:

a body having an interior and an exterior, a rotatable drive screw having an external thread over at least a portion of its length and extending through the body and projecting out at least one side of the body, an internally threaded member captured on the drive screw on the interior of the body, the internally threaded member being held against rotation during rotation of the drive screw, so as to cause the internally threaded member to travel along a length of the drive screw as the drive screw is rotated in both a first and second rotational direction, a sleeve surrounding the drive screw, extending into the interior of the body and into the exterior of the body, and being axially adjustable relative to the drive screw, from the exterior of the body, the sleeve having an abutment surface engagable by the internally threaded member upon a sufficient rotation of the drive screw in one of the two directions, and a locking arrangement to lock the first sleeve in a selected axial position relative to the drive screw, the locking arrangement comprising a 180 degree pocket formed in one side of the first sleeve, a locking nut collar received in the pocket, and threadingly engaged on the first end of the drive screw, and a tightening mechanism in the form of a screw to tighten the locking nut collar to the drive screw.

22. A valve actuator comprising:

a body having an interior and an exterior, a rotatable drive screw having an external thread over at least a portion of its length and extending through the body and projecting out at least one side of the body, an internally threaded member captured on the drive screw on the interior of the body, the internally threaded member being held against rotation during rotation of the drive screw, so as to cause the internally threaded member to travel along a length of the drive screw as the drive screw is rotated in both a first and second rotational direction, a first sleeve surrounding the drive screw, extending into the interior of the body and into the exterior of the body, and being axially adjustable relative to the drive screw, from the exterior of the body, the first sleeve having an abutment surface engagable by the internally threaded member upon a sufficient rotation of the drive screw in one of the two directions, and a second sleeve receiving the second portion of the drive screw and being received in the second bearing, the second sleeve being axially adjustable relative to the drive screw from the exterior of the body, the second sleeve having an abutment surface engagable by the nut upon a sufficient rotation of the drive screw in a second of the two directions, and a locking arrangement to lock the first sleeve in a selected axial position relative to the drive screw, the locking arrangement comprising a plurality of diametrical holes, axially spaced apart, in the first portion of the drive screw, at least one slot formed in the first sleeve and a pin received in one of the diametrical holes and in the slot.

* * * * *